United States Patent
Lee

(10) Patent No.: US 8,937,753 B2
(45) Date of Patent: Jan. 20, 2015

(54) IMAGE SCANNING APPARATUS, IMAGE COMPENSATION METHOD AND COMPUTER-READABLE RECORDING MEDIUM

(71) Applicant: Samsung Electronics Co., Ltd., Suwon-si (KR)

(72) Inventor: Eul-hwan Lee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/908,099

(22) Filed: Jun. 3, 2013

(65) Prior Publication Data

US 2014/0177010 A1 Jun. 26, 2014

(30) Foreign Application Priority Data

Dec. 24, 2012 (KR) ........................ 10-2012-0152400

(51) Int. Cl.
*H04N 1/00* (2006.01)
*H04N 1/387* (2006.01)

(52) U.S. Cl.
CPC ......... *H04N 1/00798* (2013.01); *H04N 1/3878* (2013.01)
USPC ........... 358/474; 358/448; 358/519; 358/523; 358/525

(58) Field of Classification Search
USPC ......... 358/474, 468, 448, 500, 504, 515, 519, 358/523, 525
See application file for complete search history.

(56) References Cited

U.S. PATENT DOCUMENTS

| | | | |
|---|---|---|---|
| 4,829,452 A | 5/1989 | Kang et al. | |
| 5,027,227 A | 6/1991 | Kita | |
| 5,093,653 A | 3/1992 | Ikehira | |
| 5,187,753 A | 2/1993 | Bloomberg et al. | |
| 6,310,984 B2 | 10/2001 | Sansom-Wai et al. | |
| 6,415,064 B1 | 7/2002 | Oh | |
| 6,556,197 B1 * | 4/2003 | Van Hook et al. | 345/419 |
| 7,120,314 B2 | 10/2006 | Schweid et al. | |
| 7,675,523 B2 | 3/2010 | Ushida et al. | |
| 8,027,061 B2 * | 9/2011 | Wakahara | 358/1.9 |
| 2009/0208139 A1 * | 8/2009 | Ishikawa et al. | 382/305 |
| 2012/0170871 A1 * | 7/2012 | Ishikawa et al. | 382/305 |

FOREIGN PATENT DOCUMENTS

| | | |
|---|---|---|
| JP | 2002094764 | 3/2002 |
| JP | 2003250034 | 9/2003 |
| JP | 2005086598 | 3/2005 |
| JP | 2008036850 | 2/2008 |

\* cited by examiner

*Primary Examiner* — Jerome Grant, II
(74) *Attorney, Agent, or Firm* — Staas & Halsey LLP

(57) ABSTRACT

An image scanning apparatus includes a scanning unit configured to scan an original document and generate a scanned image, a storage unit configured to store the generated scanned image, an image processor including a plurality of image processing modules, the plurality of image processing modules separately including a plurality of buffers configured to store the scanned image of block units, and configured to read the generated scanned image in preset block units and perform image processing on the scanned image read in block units sequentially using the plurality of image processing modules, and a controller configured to store the image-processed scanned image in the storage unit.

20 Claims, 9 Drawing Sheets

IMAGE SCANNING APPARATUS, IMAGE COMPENSATION METHOD AND COMPUTER-READABLE RECORDING MEDIUM

CROSS-REFERENCE TO RELATED APPLICATIONS

This application claims priority under 35 U.S.C. §119 from Korean Patent Application No. 10-2012-0152400, filed on Dec. 24, 2012, in the Korean Intellectual Property Office, the disclosure of which is incorporated herein by reference in its entirety.

BACKGROUND OF THE INVENTION

1. Field of the Invention

Apparatuses and methods consistent with exemplary embodiments relate to an image scanning apparatus, an image compensation method, and a computer-readable recording medium, and more particularly, to an image scanning apparatus capable of reading a scanned image in block units and compensating the scanned image using a low capacity of buffer, an image compensation method, and a computer-readable recording medium.

2. Description of the Related Art

In general, image scanning apparatuses are apparatuses which scan original images such as texts, pictures, or films and convert the scanned image into digital data. The digital data may be displayed on a monitor of a computer or printed by the printer and generated as an output image. As an example of the image scanning apparatuses, there are scanners, copiers, facsimiles, multiple function peripherals (MFPs) configured to multiply implement functions thereof through one apparatus.

In the image scanning apparatuses, a paper may be twistedly input due to mechanical characteristics and thus a skew in which the scanned image is rotated may caused. Since an image undesired by a user is scanned or copied and the user feels uncomfortable when the image is rotated, current image scanning apparatuses have the skew compensation function.

Specifically, the skew may be compensated through an operation using the following Equation 1.

$$\begin{pmatrix} x_2 \\ y_2 \end{pmatrix} = \begin{pmatrix} \cos\theta & \sin\theta \\ -\sin\theta & \cos\theta \end{pmatrix} \begin{pmatrix} x_1 - x_c \\ y_1 - y_c \end{pmatrix} + \begin{pmatrix} x_c \\ y_c \end{pmatrix} \quad \text{[Equation 1]}$$

Here, $\theta$ is a rotation angle, x is a position in a column direction, y is a position in a row direction, $(x_c, y_c)$ is a center point, $(x_1, y_1)$ is a source position, and $(x_2, y_2)$ is a target position.

A coordinate $(x_2, y_2)$ position-adjusted through Equation 1 described above may have a real value. A pixel value corresponding an integer value of the coordinate $(x_2, y_2)$ having the real value may be obtain through interpolation using neighboring pixel values of a source image.

However, it is ineffective when a required pixel is read from a main memory, in which the source image is stored, to calculate a target pixel in terms of a bandwidth of a bus. In the related art, to solve the issue, a line memory buffer is included and used to store a small amount of line data of the source image. For example, in A4-size paper of 600 dot per inch (DPI), data of about 5 Kbyte is necessary with respect to one line per mono one channel.

However, when the skew is compensated as described above, the capacity of the line memory buffer has to be increased according to a skew angle. For example, the image is rotated in an angle range of −1 degree to 1 degree, the line memory buffer needs 60 lines. The number of pixels necessary for an operation is increased according to complexity of the interpolation and the capacity of the line memory buffer has to be increased as the resolution of an image to be processed is increased.

SUMMARY OF THE INVENTION

One or more exemplary embodiments are to provide an image scanning apparatus capable of reading a scanned image in block units and compensating the scanned image using a low capacity of buffer, an image compensation method, and a computer-readable recording medium.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an image scanning apparatus. The image scanning apparatus may include a scanning unit configured to scan an original document and generate a scanned image, a storage unit configured to store the generated scanned image, an image processor including a plurality of image processing modules, the plurality of image processing modules separately including a plurality of buffers configured to store the scanned image of block units, and configured to read the generated scanned image in preset block units and perform image processing on the scanned image read in block units sequentially using the plurality of image processing modules, and a controller configured to store the image-processed scanned image in the storage unit.

The plurality of image processing module may be connected in series and each of the plurality of image processing modules may be connected to one of the plurality of buffers configured to store the scanned image of block units.

The image processing modules may include at least one of a skew compensation module, a gamma correction module, a color correction module, an image segmentation module, and a filtering module.

The image processor may read the scanned image in a first block size including an effective pixel region having a second block size and a neighboring pixel region around the effective pixel region.

The image processor may read the scanned image so that a plurality of scanned image blocks having the first block size overlap each other.

The image processor may determine the first block size based on an effective pixel size to be processable in the plurality of image processing modules, a skew angle, and an interpolation method.

The image processing module may include a skew compensation modules configured to sense the skew angle of the scanned image and compensate for the sensed skew angle.

The skew compensation module may perform interpolation on the effective pixel region using the neighboring pixel region and output a compensated scanned image block corresponding to the effective pixel region.

The interpolation may be performed using at least one of a bilinear interpolation method and a quadratic interpolation method.

The image processor may read the generated scanned image from the storage unit in a direct memory access (DMA) manner.

The image processor may be a system on chip (SoC).

The foregoing and/or other features and utilities of the present general inventive concept may also be achieved by providing an image compensation method of an image scanning apparatus. The method may include scanning an original document to generate a scanned image, storing the generated scanned image, reading the generated scanned image in preset block units, performing image processing on the scanned image read in block units sequentially using a plurality of image processing modules separately including a plurality of buffers configured to store the scanned image of block units, and storing the image-processed scanned image.

The reading may include reading the scanned image including an effective pixel region having a second block size and a neighboring pixel region around the effective pixel region in a first block size.

The reading may include reading the scanned image so that a plurality of scanned image blocks having the first block size overlap each other.

The reading may include determining the first block size based on an effective pixel size to be processable in the plurality of image processing modules, a skew angle, and an interpolation method and reading the scanned image in the determined first block size.

The performing image processing may include sensing the skew angle of the scanned image and compensating for the sensed skew angle.

The performing image processing may include performing interpolation on the effective pixel region using the neighboring pixel region and outputting an interpolated scanned image block corresponding to the effective pixel region.

The performing interpolation may include performing the interpolation using at least one of a bilinear interpolation method and a quadratic interpolation method.

The performing image processing may include performing image processing including at least two of skew compensation, gamma correction, color correction, image segmentation, and filtering on the scanned image.

The reading may include reading the generated scanned image from a storage unit in a direct memory access (DMA) manner.

The foregoing and/or other features and utilities of the present general inventive concept may also be achieved by providing a computer-readable recording medium including a program to execute an image compensation method. The image compensation method may include scanning an original document to generate a scanned image, storing the generated scanned image, reading the generated scanned image in preset block units, performing image processing on the scanned image read in block units sequentially using a plurality of image processing modules separately including a plurality of buffers configured to store the scanned image of block units, and storing the image-processed scanned image.

The foregoing and/or other features and utilities of the present general inventive concept may also be achieved by providing an image scanning apparatus, including a scanning unit configured to scan an original document and generate a scanned image, a storage unit configured to store the generated scanned image, and an image processor including a plurality of image processing modules connected to a plurality of buffers to store data processed in the corresponding image processing modules, and configured to read the generated scanned image in the block units and sequentially perform image processing on the scanned image read in block units using the plurality of image processing modules, the image processing including a skew compensation and at least one of Gamma correction and color correction, and segmentation.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
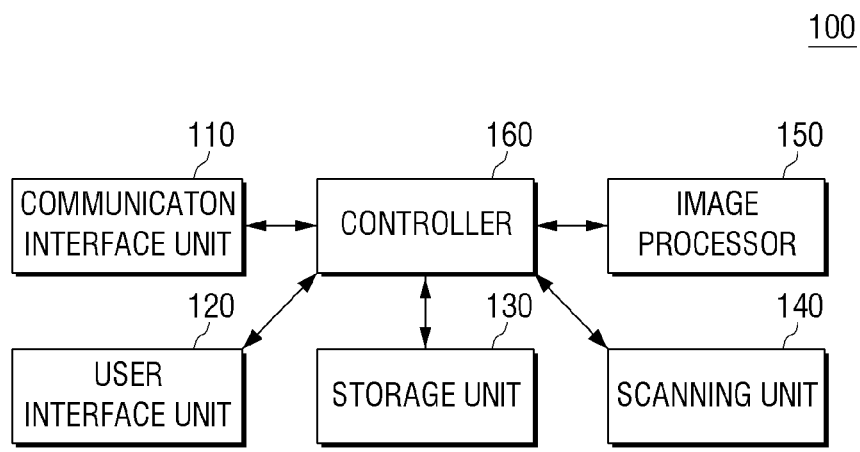
FIG. 1 is a block diagram illustrating an image scanning apparatus according to an exemplary embodiment of the present general inventive concept.

Hereinafter, exemplary embodiments will be described in more detail with reference to the accompanying drawings.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In the following description, the matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram illustrating a configuration of an image scanning apparatus 100 according to an exemplary embodiment of the present general inventive concept.

Referring to FIG. 1, the image scanning apparatus 100 according to an exemplary embodiment includes a communication interface unit 110, a user interface unit 120, a storage unit 130, a scanning unit 140, an image processor 150, and a controller 160. The image scanning apparatus may include a scanner, a copier, a facsimile, a multiple function peripheral (MFP) configured to multiply implement functions thereof through one apparatus.

The communication interface unit 110 may be connected to a host apparatus (not illustrated) such as a personal computer (PC), a laptop PC, a personal digital assistant (PDA), or a digital camera and transmit scanned data scanned in the image scanning apparatus 100 or a distortion-compensated scanned image from the image scanning apparatus 100 to the host apparatus (not illustrated). The communication interface unit 110 is formed to connect the image scanning apparatus 100 to an external apparatus. The communication interface unit 110 may be implemented to be connected to a terminal apparatus through a local area network (LAN) and an Internet network or through a universal serial bus (USB) port or a wireless port.

The communication interface unit 110 may receive a scanning command. The communication interface unit 110 may receive the scanning command or a scanned image transmission command from the host apparatus. The scanning command may include a copying command or a facsimile transmission command required in a scanning function. That is, the communication interface unit 110 may receive a copying command or a facsimile transmission command. Even when the commands are received, a skew compensation process according to an exemplary embodiment may be performed.

The user interface unit 120 may include a plurality of function keys configured to cause a user to set or select various functions supported in the image scanning apparatus 100 and display various pieces of information provided from the image scanning apparatus 100. The user interface unit 120 may be implemented with a device in which an input and an output are simultaneously implanted such as a touch screen or a device in which a mouse and a monitor are combined.

The user interface unit 120 receives a job execution command. The user interface unit 120 may receive an execution command (for example, a scanning command, a copying command, a facsimile transmission command, and the like) for the functions to be executable in the image scanning apparatus 100. At this time, the user interface unit 120 may receive a selection of a skew compensation execution to be described later. The user interface unit 120 may receive a selection of a pre-scanning execution. Here, the pre-scanning is a method of fast scanning an original document with a low resolution in advance before scanning the original document with a high resolution and may be used when a scanning region is designated. On the other hand, the user interface unit 120 may be implemented so that the skew compensation execution is selected by the user or the skew compensation is automatically executed without the selection of the user.

The user interface unit 120 may display the scanned image. The user interface unit 120 may display a scanned image generated by a pre-scanning job in a preview and display a scanned image generated by a scanning job.

The storage unit 130 may store the scanned image scanned in the image scanning apparatus 100. The storage unit 130 may store a scanned image compensated in the image processor 150 to be described later. The storage unit 130 may include a volatile memory. Alternatively, the storage unit 130 may include a volatile memory and a nonvolatile memory. At this time, the scanned image scanned or compensated as described above may be stored in the volatile memory (for example, a dynamic random access memory (DRAM)).

The storage unit 130 may be implemented with a storage medium in the image scanning apparatus 100 and an external storage medium, for example, a removable disc including a USB memory, a storage medium connected to a host, a web server through a network, or the like.

The scanning unit 140 scans an original document on a flatbed and generates a scanned image. The scanning unit 140 may include a stage glass on which the original document is loaded and a scanning head configured to reciprocally move below the stage glass and scan an original document. The canning unit 140 may be implemented to include an automatic providing apparatus and may scan the original document loaded on the automatic providing apparatus and automatically provided thereto.

The scanning unit 140 may scan the original document one or more times. The scanning unit 140 may fast scan (pre-scan) the original document with a low resolution (first resolution) to generate a first scanned image having a low resolution and then secondarily scan the original document with a high resolution (second resolution) to generate a second scanned image. The first scanned image may be usable in the skew compensation execution of the image processor 150 according to a design or user preference. It is also possible that the second scanned image can be used in the skew compensation execution of the image processor 150 according to a design or user preference.

The image processor 150 reads the generated scanned image in preset block units from the first scanned image or the second scanned image and performs image processing on the scanned image read in block units using a plurality of image processing modules (or blocks). Here, the plurality of image processing modules may include a skew compensation module, a gamma correction module, a color correction module, an image segmentation module, and a filtering module, and the like. Each of the plurality of image processing module may separately include a buffer configured to store an image of block units.

Detailed configuration and operation of the image processor 150 will be described later with reference to FIG. 2.

The controller 160 controls respective components in the image scanning apparatus 100. When the controller 160 receives a scanning command from the user interface unit 120 or the communication unit 110, the controller 160 may control the scanning unit 140 to perform a scanning job and control the image processor 150 to perform compensation on a scanned image generated by the scanning job.

The controller 160 may control the storage unit 130 to store the compensated scanned image in block units and control the communication interface 110 to transmit the stored scanned image to an external terminal apparatus (or a specific storage medium designated by the user). Although not illustrated in the exemplary embodiment, when the image scanning apparatus 100 is an MFP configured to perform a printing job, the controller 160 may control the compensated scanned image to be printed.

The image scanning apparatus according to the exemplary embodiment may perform compensation (for example, skew compensation) using the image processor having a small capacity of memory buffer. Further, the image scanning apparatus according to the exemplary embodiment may use a small capacity of memory buffer even when an image has a high resolution or a complicated interpolation method is used. The image scanning apparatus 100 according to the exemplary embodiment may collectively perform other image compensation in addition to the skew compensation using the plurality of image processing modules.

The exemplary embodiment has illustrated that the image processor 150 and the controller 160 are separately configured from each other, but the image processor 150, the controller 160, and/or one or more other units may be implemented with one system on chip (SoC).

Figure 2:
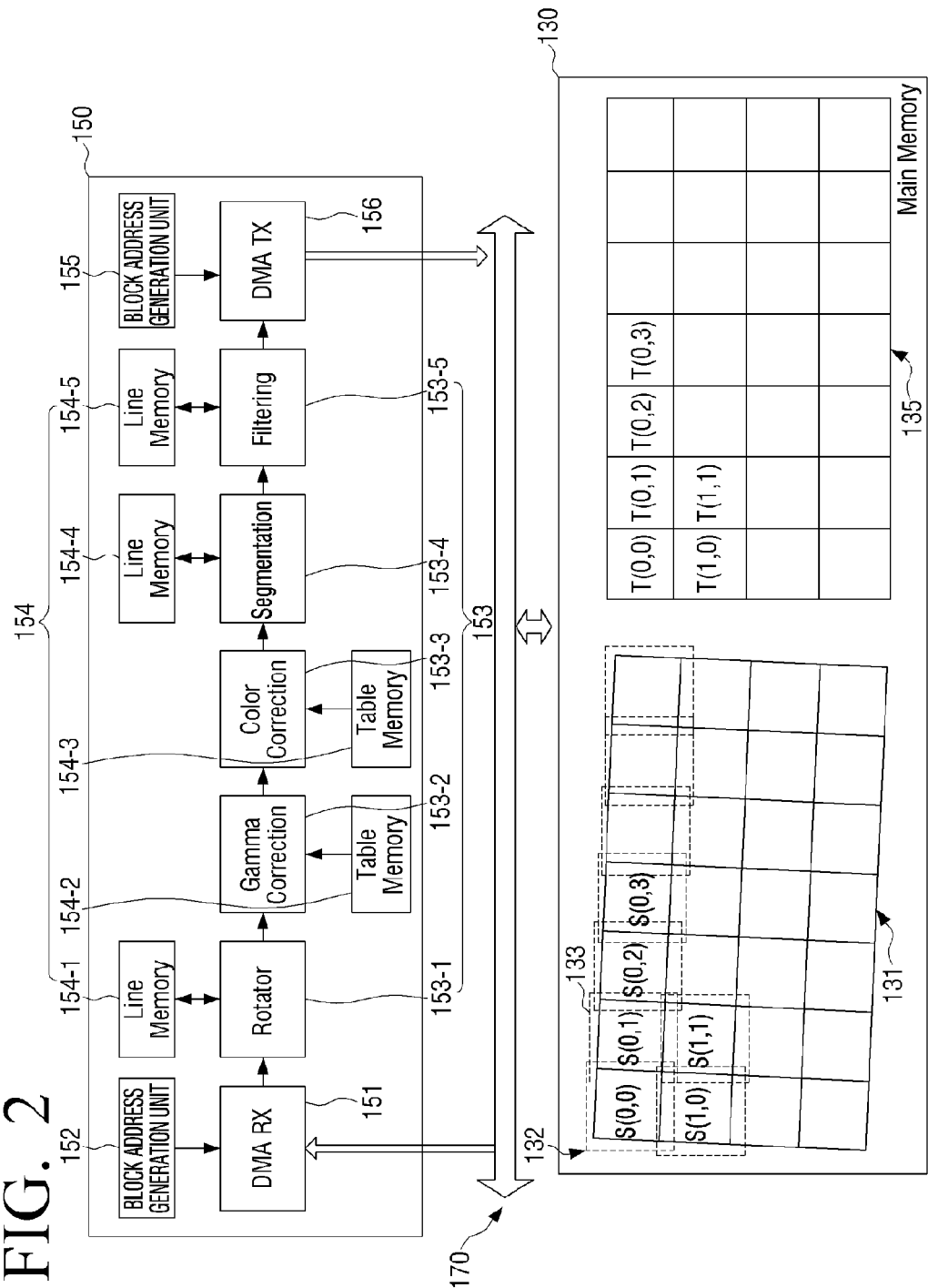
FIG. 2 is a block diagram illustrating an image processor of the image scanning apparatus of FIG. 1.

FIG. 2 is a block diagram illustrating the image processor 150 of the image scanning apparatus 100 of FIG. 1.

Referring to FIG. 2, the image processor 150 includes a reader 151, a first block address generation unit 152, a plurality of image processing modules 153, a plurality of buffers 154, a second block address generation unit 155, and a writer 156.

The reader (DMA Rx) 150 may read a partial image 132 among first block units of the scanned image 131 stored in the storage unit 130 in a direct memory access (DMA) manner. The reader 151 may read a scanned image having a first block size (hereinafter, referred to as a scanned image block) corresponding to a block address provided from the first block address generation unit 152 to be described later from the storage unit 130 through a system bus 170. The reader 151 may transmit the read scanned image block 132 to the plurality of image processing modules 153. When the reading and transmitting of the first block 132 is completed, the reader 151 may perform reading on next block 133 overlapping the first block 132.

The first block address generation unit 152 determines a size of the first block (that is, a first block size). The first block address generation unit 152 determines the first block size based on an effective pixel size to be processable in the plurality of image processing modules 153, a skew angle, and an interpolation method. The first block may include an effective pixel region having a second block size and a neighboring pixel region around the effective pixel region. Detailed description of determining the first block size will be described later with reference to FIG. 6.

The first block address generation unit 152 may divide the scanned image into a plurality of scanned image blocks overlapping each other and sequentially provide addresses of the divided scanned image blocks having the first block size to the reader 151. The first block address generation unit 152 may be implemented to provide the first block size described above and a reference coordinate of a block to be read to the reader 151. For example, the first block address generation unit 152 calculates a coordinate value having an integer value closest thereto after a position corresponding to a left corner of the first block is rotated by Equation 1. The first block address generation unit 152 may select the block size by considering neighboring pixels (that is, neighboring pixels) required to perform the interpolation.

Each of the plurality of image processing modules 153 may be separately connected to corresponding one of the plurality of buffers 154 and performs image processing using the corresponding buffer connected thereto. Here, the plurality of image processing modules 153 may include a skew compensation module 153-1, a gamma correction module 153-2, a color correction module 153-3, an image segmentation module 153-4, and a filtering module 153-5. The skew compensation module 153-1 may be referred to as a rotator. The exemplary embodiment has described that the plurality of image processing modules are five, but the plurality of image processing modules may be implemented to include only two or five or to include six modules or more including an additional module addition to the above-described modules. The exemplary embodiment has illustrated and described that the image processing modules perform operations such as a gamma correction operation and a color correction operation after the performing of the skew compensation, but the plurality of image processing modules may be implemented to perform the gamma correction and color correction before the performing of the skew compensation.

The skew compensation module 153-1 is connected to a first buffer 154-1 and stores the scanned image block provided from the reader 151 in the first buffer 154-1. The skew compensation module 153-1 may sense a skew angle of the scanned image. The exemplary embodiment has described that the skew compensation module 153-1 checks whether or not the skew is present and senses the skew angle, but it may be implemented that the first block address generation unit 152 or other separate modules checks whether or not the skew is present and sense the skew angle.

The skew compensation module 153-1 compensates the sensed skew angle of the scanned image block stored in the first buffer 154-1. A detailed configuration and operation of the skew compensation module 153-1 will be described later with reference to FIG. 4.

The gamma correction module 153-2 is connected to a second buffer 154-2 configured to store a gamma table and performs linear correction on the scanned image block provided from the skew compensation module 153-1. Specifically, the gamma correction module 153-2 may linearly correct unique gamma function type distortion characteristic of the image sensor using the gamma table stored in the second buffer 154-2.

The gamma correction module 153-2 may correct a brightness value difference with respect to the skew-compensated image block. The gamma correction module 153-2 may correct shading which means the difference of the bright value generated when light is not uniformly formed with respect to a main radiation direction of an image by a light source. It may be implemented that the shading correction is performed before the gamma correction is performed in the gamma correction module 153-2.

The color correction module 153-3 is connected to a third buffer 154-3 configured to store a color correction table and perform color correction on the scanned image block provided from the gamma correction module 153-2.

The image segmentation module 153-4 is connected to a fourth buffer 154-4 and stores the scanned image block provided from the color correction module 153-3 in the fourth buffer 154-4. The image segmentation module 153-4 may remove an unnecessary portion (for example, a neighboring pixel region) from the scanned image block stored in the fourth buffer 154-4. In the above-described exemplary embodiment, the image is processed in the first block size including the effective pixel region having the second block size and a neighboring pixel region around the effective pixel region. Therefore, the image segmentation module 153-4 may remove the unnecessary neighboring pixel region from the image block of the first block size and output a removing result.

The filtering module 153-5 is connected to a fifth buffer 153-5 and stores the scanned image block provided from the image segmentation module 154-5. The filtering module 154-5 performs on filtering processing on the image-segmented image block.

The second block address generation unit 155 generates addresses of the storage unit 130 in which the scanned image blocks image-processed in the plurality of image processing modules are to be stored. The exemplary embodiment has described that the second block address generation unit 155 generates the addresses of the storage unit 130, but it may be implemented that the storage addresses of the image-processed scanned image blocks are generated in the first block address generation unit 152 and the generated addresses are provided to the second block address generation unit 155.

The writer 156 may store the image blocks processed in the plurality of image processing modules in a preset region 135 of the storage unit 130 through the system bus 170 based on the addresses generated in the second block address generation unit 155.

Figure 3:
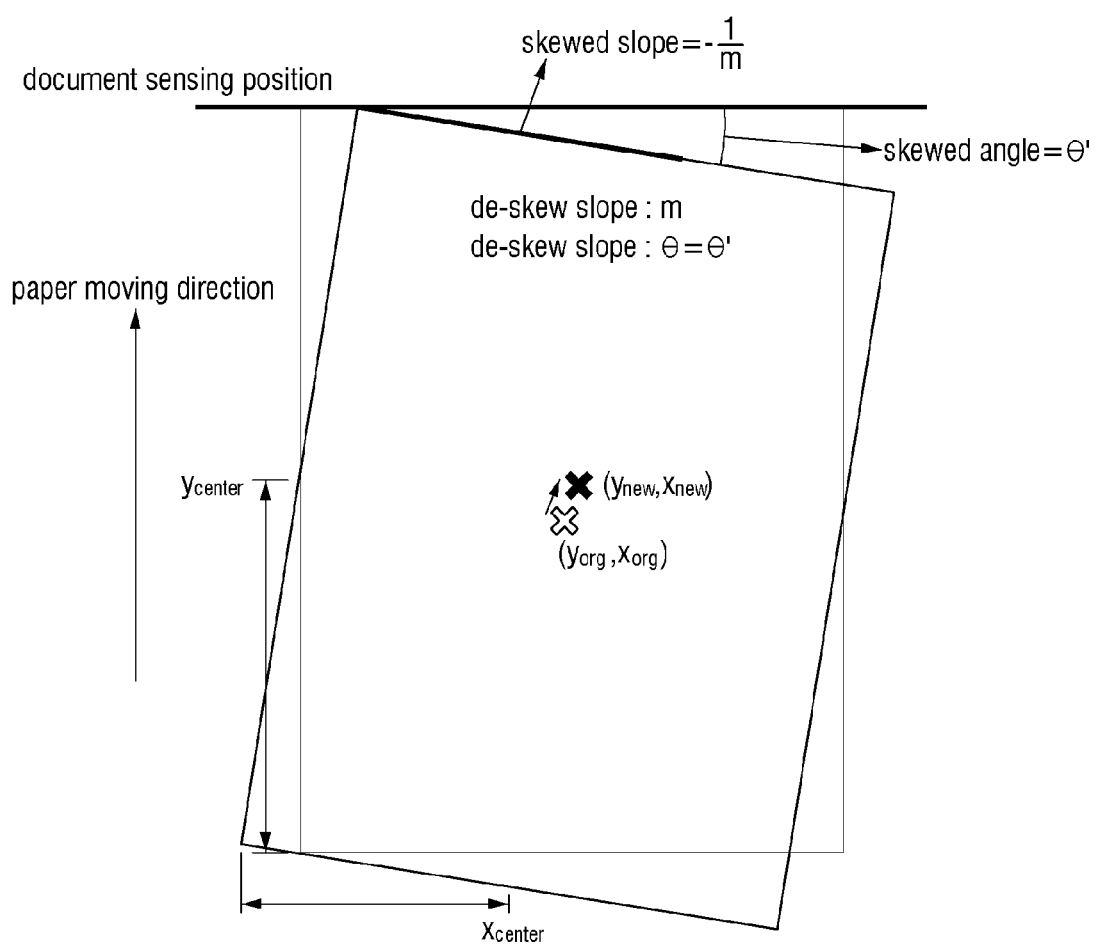
FIG. 3 is a view explaining skew compensation.

FIG. 3 is a view illustrating skew sensing and skew compensation.

Referring to FIG. 3, when the original document is fed, the image processor 150 senses whether a skew is generated from a top boundary of a printing paper.

When it is determined whether the skew is generated, the image processor 150 may calculate a specific skew angle. The methods of calculating the skew angle have been widely known and thus detailed description thereof will be omitted.

It can be seen from FIG. 3 that a printing medium is tilted by an angle θ' to the left. When the printing medium is tilted to the left or to the right, the image processor 150 may detect the tilted angle as the skew angle.

Figure 4:
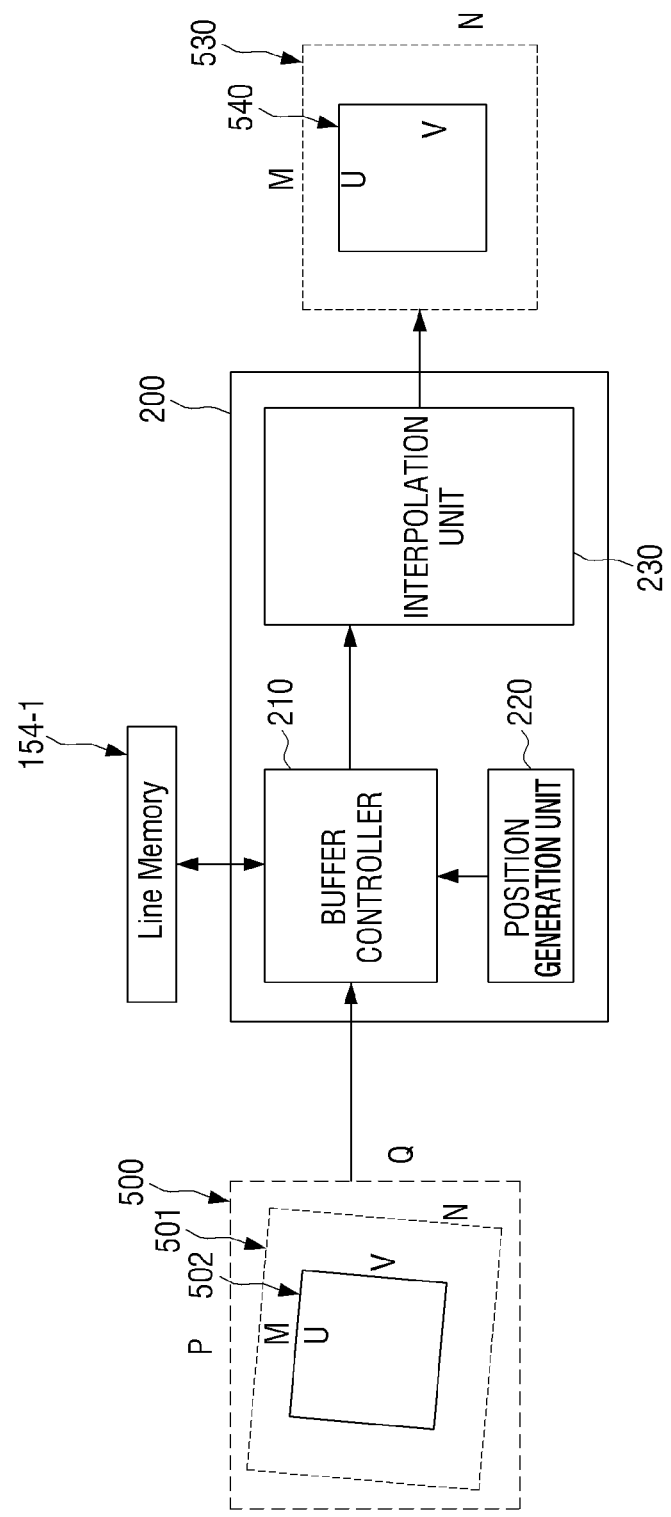
FIG. 4 is a view explaining an operation of a skew compensation module of FIG. 2.

FIG. 4 is a view explaining an operation of the skew compensation module of FIG. 2.

Referring to FIG. 4, the skew compensation module 153-1 or 200 may rotate the read scanned image block by an angle θ in a clockwise direction or counterclockwise direction with respect to a center portion disposed around (xc, yc) as in Equation 1 and obtain a target image. In the exemplary embodiment, since the source image is rotated by the angle θ to a clockwise direction, the skew compensation module 200 may compensate for the skew by rotating the source image by the angle θ to the counterclockwise direction.

On the other hand, in a digital image, the source image and the target image are configured of coordinates having integer values and the pixel value corresponding to each of the coordinates may be generally represented in a digital value having 256 gradations of 0 to 255.

Therefore, after the skew compensation module 200 receives an image 500 on which the skew compensation is not performed and performs the skew compensation, the skew compensation module 200 outputs the skew-compensated scanned image block 530. As illustrated in FIG. 4, for the other image processing modules of the next stages, the skew-compensated scanned image has overlapping data (an outer region 530 of a region 540).

As illustrated in FIG. 4, the skew compensation block 200 may include a buffer controller 210, a position generation unit 220, and an interpolation unit 230.

The buffer controller 210 receives a scanned image block and stores the received scanned image block in the first buffer 154-1. The buffer controller 210 performs a function to read data required in the interpolation unit 230 and provide the read data to the interpolation unit 230.

The position generation unit 220 generates an address from which the date required in the interpolation unit 230 is to be read.

The interpolation unit 230 performs interpolation on the effective pixel region using the neighboring pixel region. Specifically, the interpolation unit 230 performs the interpolation using neighboring pixel values of the effective pixel region to calculate the pixel value of the target. The interpolation unit 230 may perform the interpolation using a bilinear interpolation method or a quadratic interpolation method. The interpolation method will be described later with reference to FIG. 5.

Figure 5:
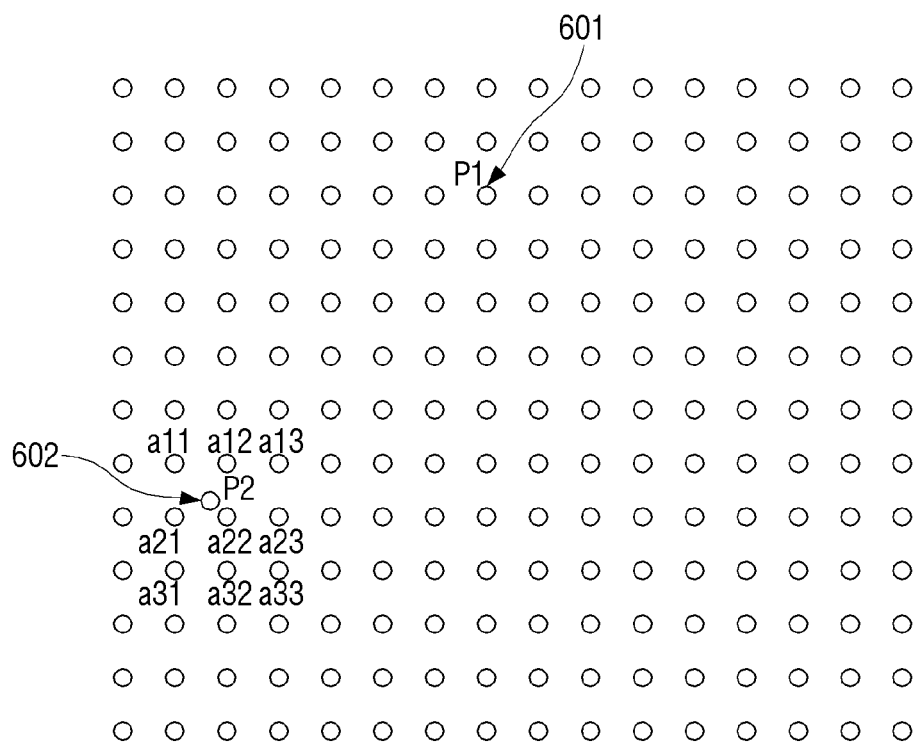
FIG. 5 is a view explaining an interpolation operation according to an exemplary embodiment of the present general inventive concept.

FIG. 5 is a view illustrating an interpolation operation according to an exemplary embodiment of the present general inventive concept.

Referring to FIG. 5, a coordinate 601 in which P1(x1, y1) is rotated becomes a coordinate P2 (x2, y2) 602. However, as illustrated in FIG. 5, P2 has a real value, but a pixel value corresponding to P2 is not existed. Therefore, the interpolation unit 230 may perform the interpolation using pixel values a11 to a33 around the coordinate P2. For example, the interpolation may be performed using four values, that is, a11, a12, a21, and a22 when a bilinear interpolation is used, while the interpolation may be performed using nine values, that is, a11 to a33 when a quadratic interpolation method is used.

Since the used neighboring pixel positions are different according to the interpolation method, the size of the first bock is changed according to the interpolation method.

Figure 6:
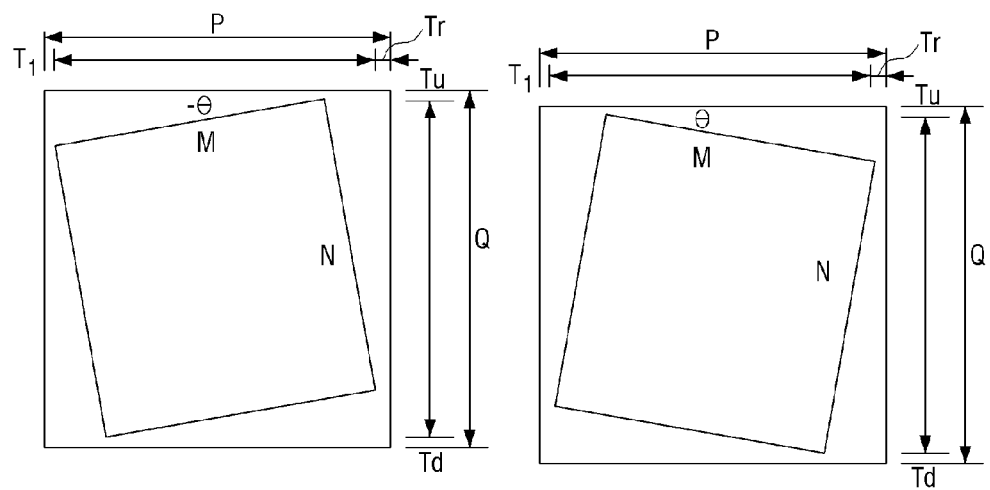
FIG. 6 is a view explaining a block size according to an exemplary embodiment of the present general inventive concept.

FIG. 6 is a view illustrating a block size according to an exemplary embodiment of the present general inventive concept. FIG. 6 is an enlarged view illustrating a region of a source image corresponding to a target block and a region including neighboring pixels.

Referring to 6, the size of the block read from the scanned image may be calculated according to the following Equation 2.

$$P = [M \times \cos(\theta) + N \times \sin(\theta)] + (T_l + T_r)$$

$$Q = [M \times \sin(\theta) + N \times \cos(\theta)] + (T_u + T_d)$$ [Equation 2]

Here, θ is a skew angle, P is a horizontal length of a first block, Q is a vertical length of the first block, M is a horizontal length of second block (an effective pixel), N is a vertical length of the second block (effective pixel), and each of $T_l$, $T_r$, $T_u$, and $T_d$ is the number of neighboring pixels required for interpolation. Specifically, $(T_l+T_r)=2$ and $(Tu+T_d)=2$ when the interpolation is a bilinear interpolation method, while $(T_l+T_r)=3$ and $(Tu+T_d)=3$ when the interpolation method is a quadratic interpolation method.

A horizontal length P2 of the memory buffer is equal to P and a vertical length Q thereof as follows.

$$P2 = P$$

$$Q2 = [N \times \sin(\theta)] + (T_l + T_r)$$

It has been described that the first block size is calculated so that the effective pixel region does not overlap neighboring blocks, but the first block size may be calculated so that the second blocks overlap each other.

Figure 7:
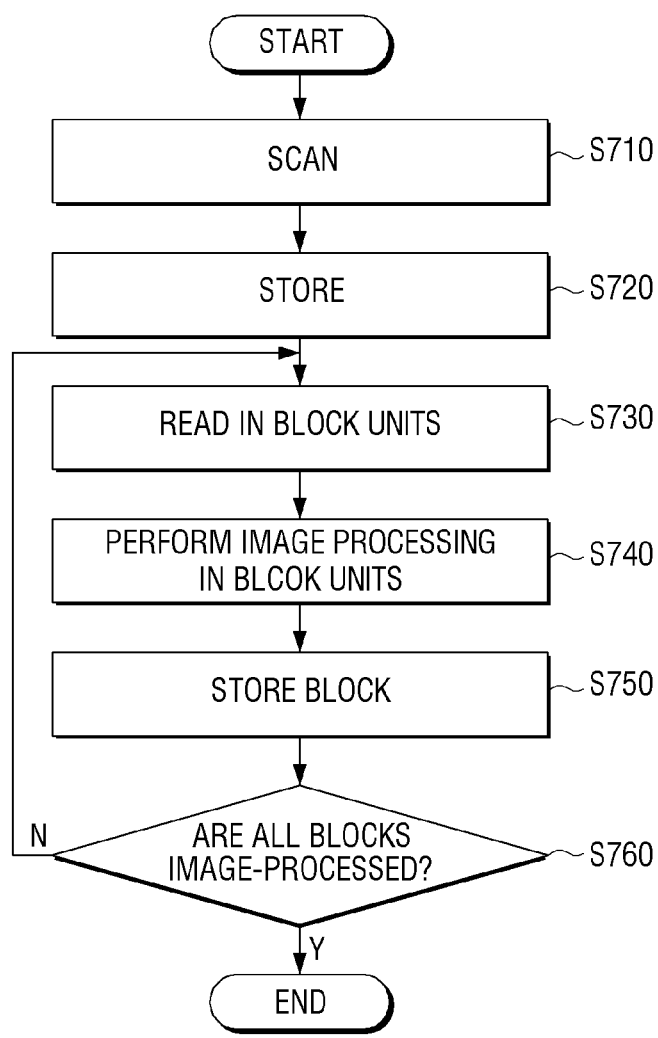
FIG. 7 is a flow chart illustrating an image processing method according to an exemplary embodiment of the present general inventive concept.

FIG. 7 is a flowchart illustrating an image processing method according to an exemplary embodiment of the present general inventive concept.

Referring to FIG. 7, first, image scanning apparatus scans an original document and generates a scanned image at operation S710.

The image processing apparatus stores the generated scanned image in the storage unit at operation S720. The scanned image scanned in the scanning unit may be stored in a preset region of the memory.

The image scanning apparatus reads the generated scanned image in preset block units at operation S730. The operation of reading in preset block units will be described later with reference to FIG. 8.

The image scanning apparatus performs image processing on the scanned image read in block units sequentially using the plurality of image processing modules which separately include the buffers configured to the scanned images of block units at operation S740. The image scanning apparatus may preferentially perform skew compensation on the scanned image read in block units using the skew compensation module and then sequentially perform other image processing on the skew-compensated scanned image of block units. The plurality of image processing operations using the plurality of image processing modules have been described in advance with reference to FIG. 2 and detailed description thereof will be omitted.

The image scanning apparatus stores the image-processed scanned image of block units at operation S750. The image scanning apparatus may store the image-processed scanned image of block units in a preset region of the memory corresponding to a position of the block.

The image scanning apparatus determines whether or not the image processing is performed on all blocks at operation S760. When it is determined that the image processing is not performed on all the blocks, the image scanning apparatus repeatedly perform operations S730, S740, and S750 as described above on blocks on which image processing are not performed at operation S760.

The image compensation method according to the above-described exemplary embodiment may perform compensation (for example, skew compensation) using the image processor having a small capacity of memory buffer. Further, even when an image has high resolution or a complicate interpolation method is used, the small capacity of memory may be used. The image concentration method according to an exemplary embodiment uses a plurality of image processing modules to collectively perform skew compensation and other image compensation. The image concentration method as illustrated in FIG. 7 may be executed on the image scanning apparatus having the configuration of FIG. 1 and further executed on image scanning apparatuses having other configurations.

The above-described image compensation method may be implemented with a program (application) including an algorithm to be executable in a computer and the program may be stored and provided in a non-transitory computer-readable medium.

The non-transitory computer-recordable medium is not a medium configured to temporarily store data such as a register, a cache, a memory, and the like but an apparatus-readable medium configured to semi-permanently store data. Specifically, the above-described applications or programs may be stored and provided in the non-transitory computer-recordable medium such as a compact disc (CD), a digital versatile disc (DVD), a hard disc (HD), a blu-ray disc, a USB, a memory card, a read only memory (ROM), and the like.

Figure 8:
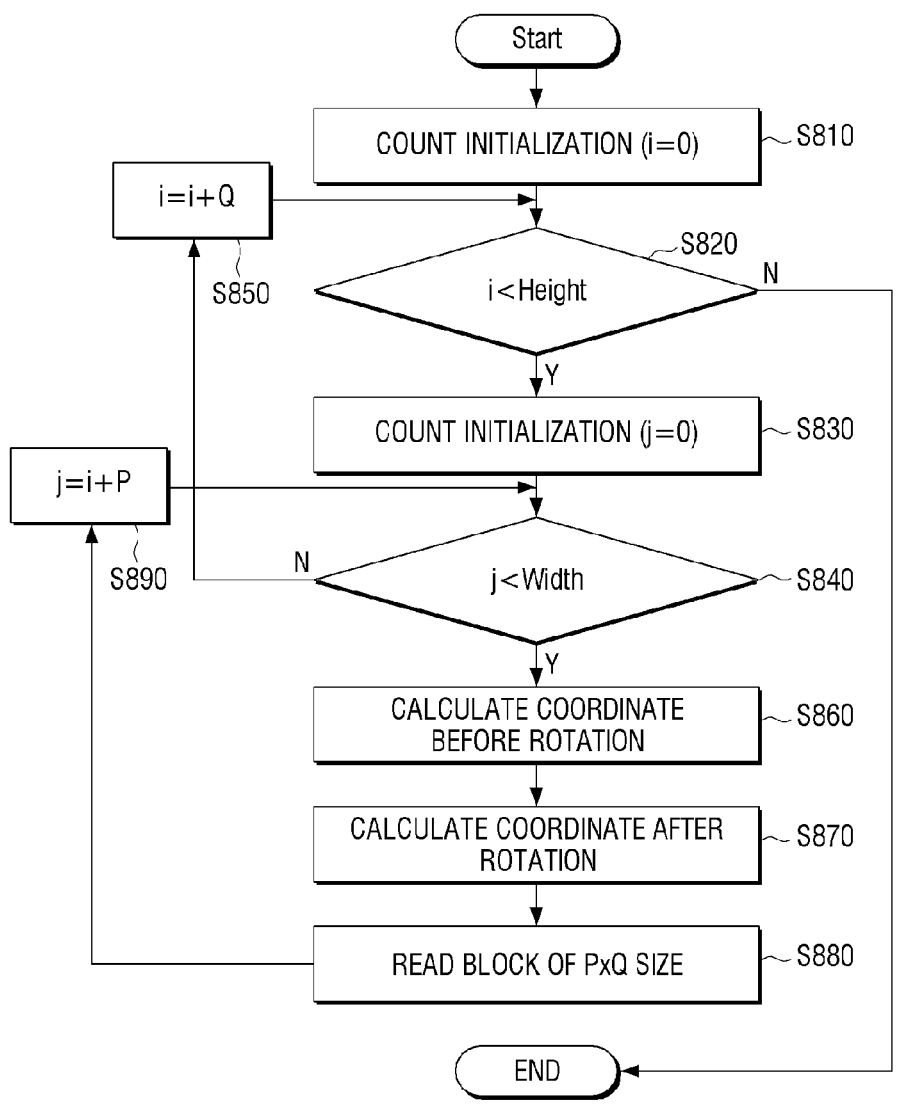
FIGS. 8 and 8A are flowcharts illustrating a read operation of the method of FIG. 7.
Figure 8A:
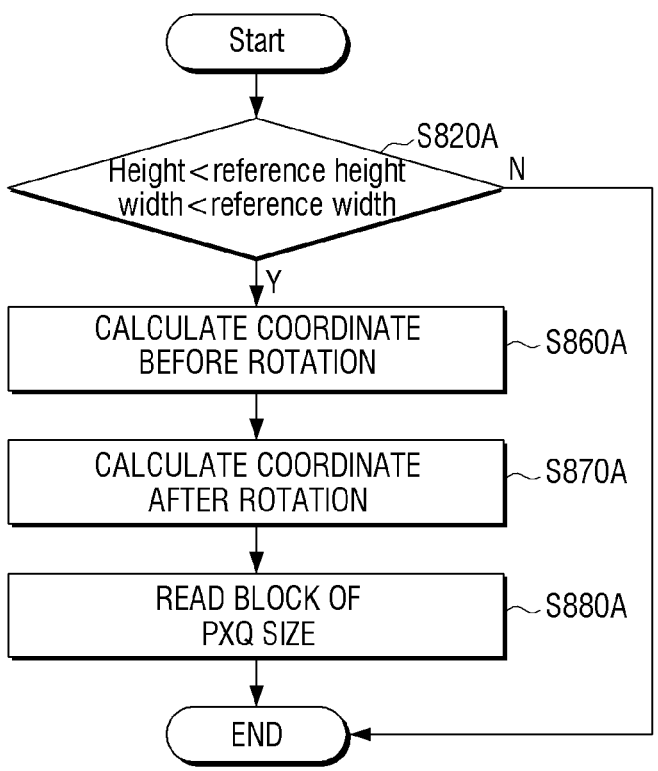

FIGS. 8 and 8A are flowcharts illustrating the read operation S730 of the method of FIG. 7.

Referring to FIG. 8, first, the image processor initializes a first count value i at operation S810.

The image processor determines whether or not the first count value is smaller than a height at operation S820 and the image processor initializes a second counter value j when it is determined that the first counter value is smaller than the height at operation S830.

The image processor determines whether or not the second counter value is smaller than a width at operation S840. When it is determined that the second counter value is larger than the width at operation S840-N, the image processor adds the vertical length (Q) of the first block to the first counter value at operation S850 and performs the operation S820 again.

When it is determined that the second counter value is smaller than the width at operation S840-Y, the image processor calculates a coordinates before rotation (S860) and then calculates a coordinate after the rotation at operation S870.

The image processor reads a block of a P×Q size from the scanned image at operation S880. The image processor adds a horizontal length (P) of the first block to the second counter value at operation S890 and performs the operation S840 again.

Referring to FIG. 8A, it is determined that a height is not greater than a reference height and a width is not greater than a reference width at operation S820A. The method may include calculating coordinates before rotation at operation S860A. Operating S870A and S880A may be same as or similar to the operations S870 and S890 of FIG. 8.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image scanning apparatus, comprising:
a scanning unit configured to scan an original document and generate a scanned image;
a storage unit configured to store the generated scanned image;
an image processor including a plurality of image processing modules, the plurality of image processing modules separately including a plurality of buffers configured to store the scanned image of block units, and configured to read the generated scanned image in preset block units and perform image processing on the scanned image read in block units sequentially using the plurality of image processing modules, the image processor to determine a first block size of the scanned image to be read based on an effective pixel size to be processable in the plurality of image processing modules, a skew angle, and an interpolation method; and
a controller configured to store the image-processed scanned image in the storage unit.

2. The image scanning apparatus of claim 1, wherein the plurality of image processing module are connected in series and each of the plurality of image processing module is connected to one of the plurality of buffers configured to store the scanned image in block units.

3. The image scanning apparatus of claim 1, wherein the plurality of image processing modules include at least one of a skew compensation module, a gamma correction module, a color correction module, an image segmentation module, and a filtering module.

4. The image scanning apparatus of claim 1, wherein the image processor reads the scanned image in the first block size including an effective pixel region having a second block size and a neighboring pixel region around the effective pixel region.

5. The image scanning apparatus of claim 4, wherein the image processor reads the scanned image such that a plurality of scanned image blocks having the first block size overlap each other.

6. The image scanning apparatus of claim 4, wherein the image processing modules include a skew compensation module configured to sense the skew angle of the scanned image and compensate for the sensed skew angle.

7. The image scanning apparatus of claim 6, wherein the skew compensation module performs interpolation on the effective pixel region using the neighboring pixel region and outputs a compensated scanned image block corresponding to the effective pixel region.

8. The image scanning apparatus of claim 7, wherein the interpolation is performed using at least one of a bilinear interpolation method and a quadratic interpolation method.

9. The image scanning apparatus of claim 1, wherein the image processor reads the generated scanned image from the storage unit in a direct memory access (DMA) manner.

10. The image scanning apparatus of claim 1, wherein the image processor is a system on chip (SoC).

11. An image compensation method of an image scanning apparatus, the method comprising:
scanning an original document to generate a scanned image;
storing the generated scanned image;

reading the generated scanned image in preset block units;
performing image processing on the scanned image read in block units sequentially using a plurality of image processing modules separately including a plurality of buffers configured to store the scanned image of block units; and storing the image-processed scanned image, wherein the reading includes determining a first block size of the scanned image to be read based on an effective pixel size to be processable in the plurality of image processing modules, a skew angle, and an interpolation method and reading the scanned image in the determined first block size.

12. The method of claim 11, wherein the reading includes reading the scanned image in the first block size including an effective pixel region having a second block size and a neighboring pixel region around the effective pixel region.

13. The method of claim 12, wherein the reading includes reading the scanned image such that a plurality of scanned image blocks having the first block size overlap each other.

14. The method of claim 11, wherein the performing image processing includes sensing the skew angle of the scanned image and compensating for the sensed skew angle.

15. The method of claim 14, wherein the performing image processing includes performing interpolation on the effective pixel region using the neighboring pixel region and outputting an interpolated scanned image block corresponding to the effective pixel region.

16. The method of claim 15, wherein the performing interpolation includes performing the interpolation using at least one of a bilinear interpolation method and a quadratic interpolation method.

17. The method of claim 11, wherein the performing image processing includes performing image processing including at least two selected from the group consisting of skew compensation, gamma correction, color correction, image segmentation, and filtering on the scanned image.

18. The method of claim 11, wherein the reading includes reading the generated scanned image from a storage unit in a direct memory access (DMA) manner.

19. A non-transitory computer-readable recording medium to contain computer-readable codes as a program to execute the image compensation method of claim 11.

20. An image scanning apparatus, comprising:
a scanning unit configured to scan an original document and generate a scanned image;
a storage unit configured to store the generated scanned image; and
an image processor including a plurality of image processing modules connected to a plurality of buffers to store data processed in the corresponding image processing modules, and configured to read the generated scanned image in the block units and sequentially perform image processing on the scanned image read in block units using the plurality of image processing modules, the image processing including a skew compensation and at least one of gamma correction and color correction, and segmentation, and the image processor to determine a first block size of the scanned image to be read based on an effective pixel size to be processable in the plurality of image processing modules, a skew angle, and an interpolation method.

* * * * *